United States Patent [19]

Ohsaki et al.

[11] Patent Number: 5,603,867
[45] Date of Patent: Feb. 18, 1997

[54] METHOD OF PRODUCTION FOR ACTIVE CARBON ELECTRODE FOR USE AS ELECTRICAL DOUBLE LAYER CONDENSER AND ACTIVE CARBON ELECTRODE OBTAINED THEREBY

[75] Inventors: Takushi Ohsaki; Akira Wakaizumi; Mitsuo Kigure; Akihiro Nakamura; Shinichi Marumo; Toshiya Miyagawa, all of Kitakoma-gun, Japan

[73] Assignee: Nippon Sanso Corporation, Tokyo, Japan

[21] Appl. No.: 523,622

[22] Filed: Sep. 5, 1995

[30] Foreign Application Priority Data

Sep. 9, 1994 [JP] Japan ................................. 6-216446
Sep. 14, 1994 [JP] Japan ................................. 6-220697
Oct. 13, 1994 [JP] Japan ................................. 6-248186

[51] Int. Cl.$^6$ .......................... H01B 1/04; C01B 31/08; C01B 31/10; C01B 31/12
[52] U.S. Cl. .......................... 252/502; 252/504; 252/511; 252/518; 264/29.5; 423/414; 423/415.1; 423/447.6; 423/447.9
[58] Field of Search .................................. 252/502, 504, 252/511, 518; 264/29.5; 423/414, 415.1, 447.6, 447.9

[56] References Cited

U.S. PATENT DOCUMENTS

| | | | |
|---|---|---|---|
| 3,786,134 | 1/1974 | Amagi et al. ............................. | 423/449 |
| 3,856,574 | 12/1974 | Amagi et al. ............................. | 252/502 |
| 5,172,307 | 12/1992 | Tabuchi et al. ......................... | 361/502 |
| 5,446,005 | 8/1995 | Endo ...................................... | 502/433 |

FOREIGN PATENT DOCUMENTS

| | | |
|---|---|---|
| 60-27113 | 2/1985 | Japan . |
| 63-110622 | 5/1988 | Japan . |
| 3-53459 | 3/1991 | Japan . |
| 3-220713 | 9/1991 | Japan . |
| 4-288361 | 10/1992 | Japan . |
| 6-69075 | 3/1994 | Japan . |

OTHER PUBLICATIONS

Denki Kagaku, vol. 56, No. 10, 1988, pp. 892–897, Ichiro Tanahashi, et al., "Properties of the Electric Double Layer Capacitors Composed of Activated Carbon Fiber Cloth Electrodes and an Organic Electrolyte".

Institute of Electronics, Information and Communication Engineered Technical Report, vol. 89, No. 384 (CPM89 86–93), 1990, pp. 1–6, Takashi Saito, et al., "Evaluation of Activated Carbons For Electric Double Layer Capacitor".

Primary Examiner—Douglas J. McGinty
Assistant Examiner—M. Kopec
Attorney, Agent, or Firm—Oblon, Spivak, McClelland, Maier & Neustadt, P.C.

[57] ABSTRACT

It is the objective of the present invention to provide an active carbon electrode which is of sufficient mechanical strength to be formed into a large plate, may be suitably used as an electrical double layer condenser capable of a large current discharge, and which can realize a high capacitance. The method of production for such an active carbon electrode comprises the steps of a) producing a carbon base material by carrying out a first activation treatment to a carbon material obtained by carbonization of a carbon compound; b) producing a formed body by adding a binder to the carbon base material; c) carbonizing the formed body; and d) producing an active carbon electrode by carrying out a second activation treatment to the carbonized formed body.

10 Claims, 11 Drawing Sheets

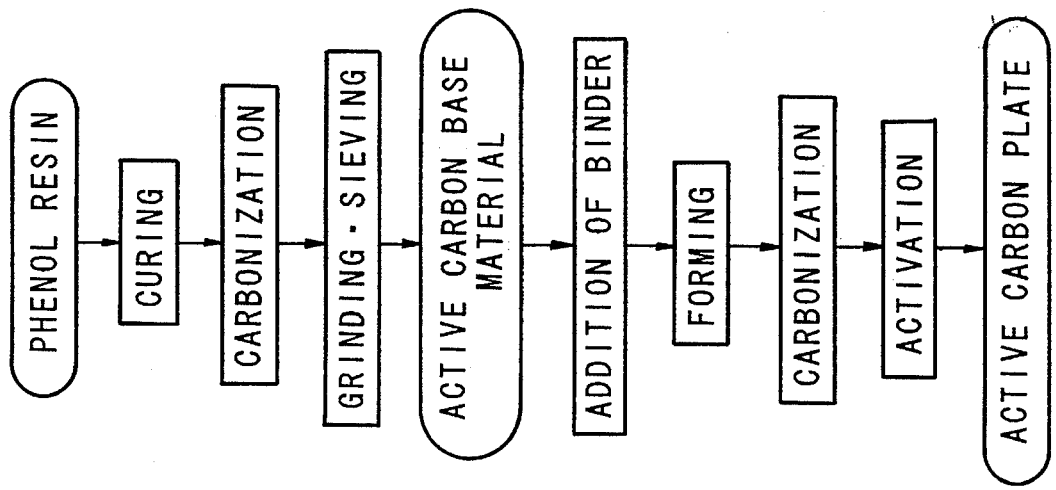
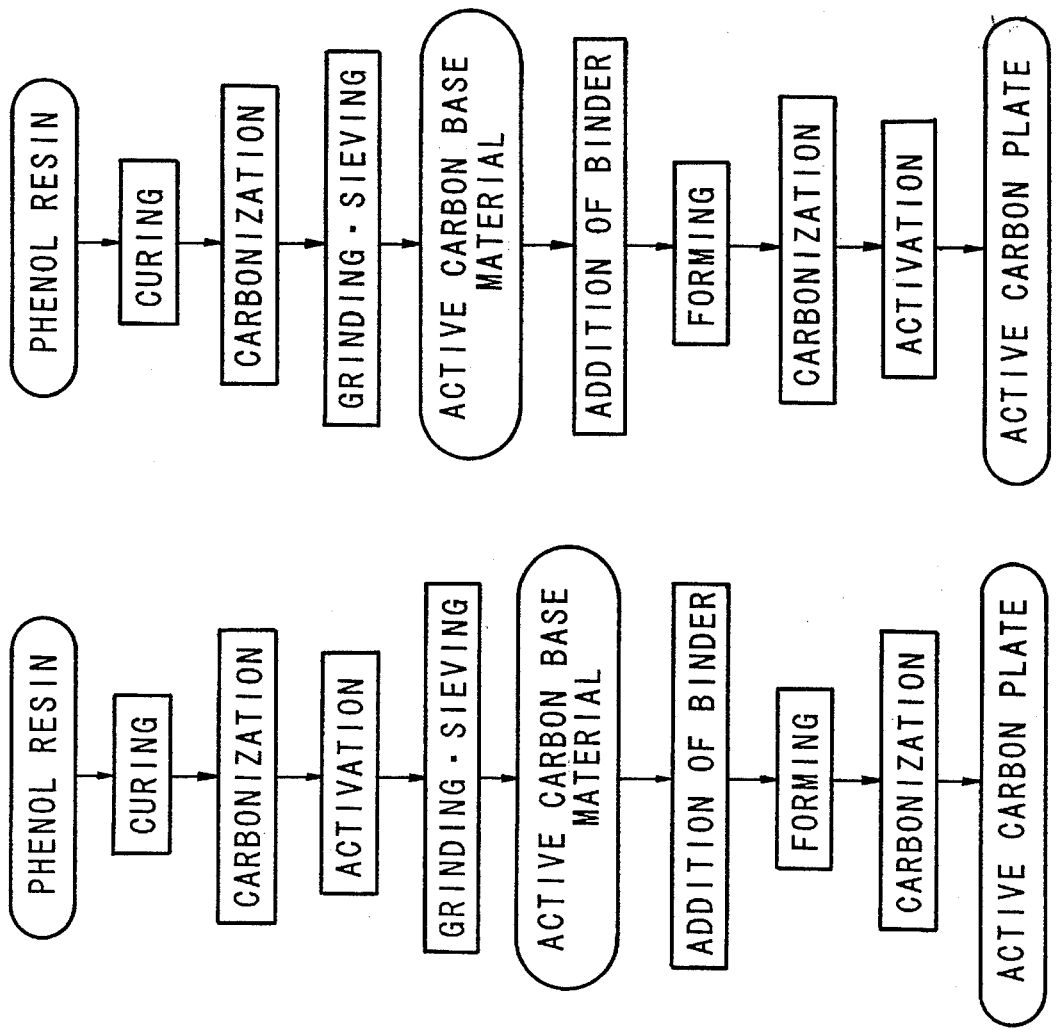
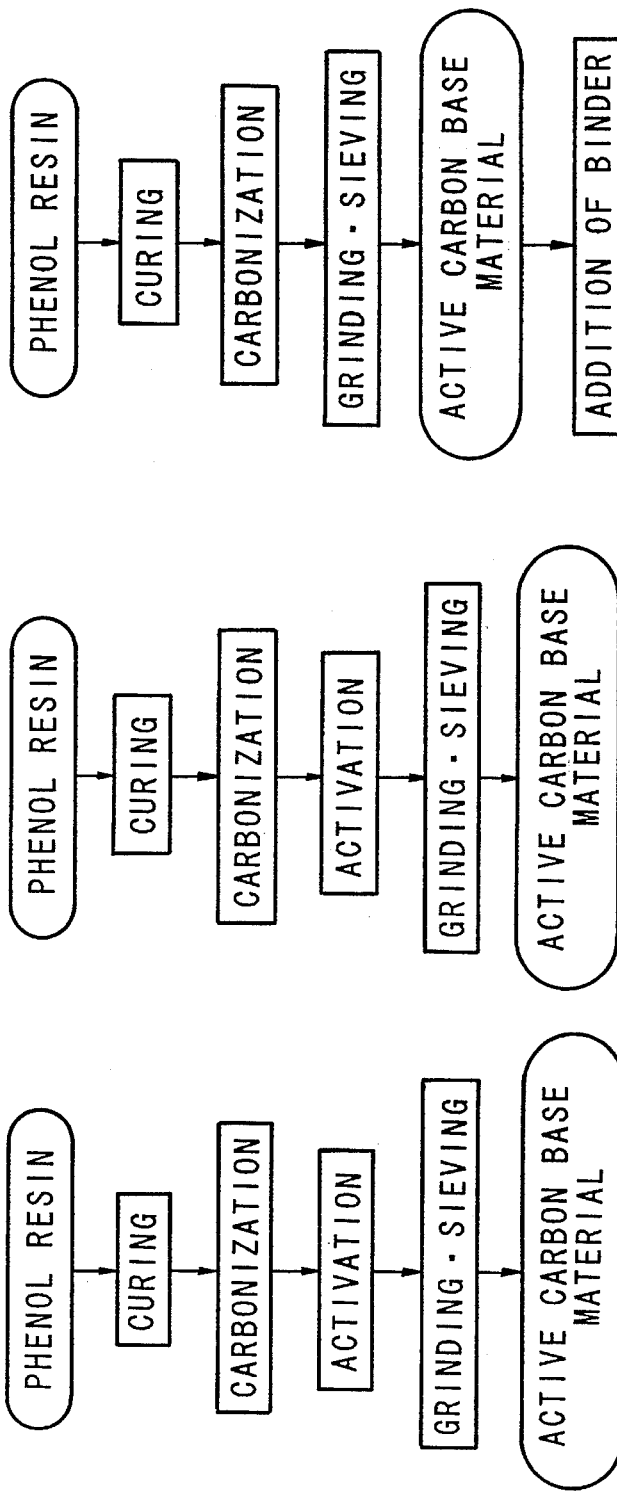

METHOD OF PRODUCTION FOR ACTIVE CARBON ELECTRODE FOR USE AS ELECTRICAL DOUBLE LAYER CONDENSER AND ACTIVE CARBON ELECTRODE OBTAINED THEREBY

BACKGROUND OF THE INVENTION

1. Field of the Invention

The present invention relates to a method of production for an active carbon electrode which can be employed as an electrical double layer condenser, and to an active carbon electrode obtained by the method.

2. Description of the Related Art

Electrical double layer condensers are utilized as back-up power sources in electronic devices such as personal computers. The use of electrical double layer condensers as auxiliary power sources for temporarily supplying a large current, as in the case of an auxiliary battery for a car, is also being developed. The electrodes in this electrical double layer condenser are referred to as "polarizable electrodes", and are required to have a large capacitance. A conductive carbon material having a large specific surface area is therefore used as the material for the polarizable electrode. Active carbon is particularly preferable for this purpose. Such active carbon base materials are available in the form of both powders and fibers.

A variety of pyrolytic carbon compounds, from carbon substances such as coke, coal, coconut shell char and the like, as well as thermosetting resins like phenol resin, may be used as the source material in making active carbon.

FIG. 14 is a schematic diagram showing the process for producing active carbon in the case where phenol resin is used as the source material. As shown in this figure, the phenol resin is first cured, and then undergoes dry distillation to volitize non-carbon components, thereby completing the carbonization process. Activation is then carried out, followed by grinding and sieving as necessary to obtain an active carbon base material ranging from a powder to granular form.

Additionally, a method is also known for obtaining a fibrous active carbon base material by using acrylic fibers as the carbon compound source material and carrying out the carbonization process in the same way while maintaining the form of the fibers.

Polarizable electrodes for electrical double layer condensers conventionally have been used in paste form by mixing the active carbon base material, ranging from powder to granular form, with a sulfuric solution. However, a large current could not be conveyed due to the large contact resistance between the active carbon particles. Similarly, when using a fibrous activated carbon cloth, there is low contact resistance between the fibers and the active carbon density per unit volume is small, making it impossible to obtain a large current.

Accordingly, a method such as shown in FIG. 15 may be considered wherein a binder is added to the active carbon base material and molded. The added binder then undergoes carbonization in the same way, followed by sintering to form a molded body in the form of a plate. A pyrolytic carbon compound which, after carbonization, will form a carbon substance identical to that of the base material may be selected for the binder. Accordingly, in the present case, it is preferable to use phenol resin, since it is identical to the source material.

The use of a plate shaped formed body having a large density as a polarizable electrode can be anticipated as well for the case where fibrous active carbon is employed as the base material, provided that the interval of space between the fibers is embedded with the binder, followed by carbonization in the same manner and sintering.

However, in an active carbon polarizable electrode for use as an electrical double layer condenser that is obtained by adding a binder to a conventional active carbon base material as described above and carrying out carbonization and sintering, the capacitance relative to the weight of the electrode was sometimes lower than that of the base material. It is believed that the reason for this is not only because in the conventional method described above, the carbonaceous components formed by the carbonization of the added binder are not activated but also because the activity of the base material is somehow impaired by the carbonaceous components.

Therefore, as shown in FIG. 16, an attempt was made to carry out the activation treatment last, after adding the binder to unactivated carbon powder and forming, rather than carrying out activation prior to obtaining the active carbon base material. However, a base material having sufficient mechanical strength could not be obtained, with cracks occurring when the activation treatment was carried out, making forming difficult. Further, the capacitance did not rise as much as anticipated.

Thus, active carbon electrodes formed using conventional methods as explained above have poor mechanical strength, making it impossible to obtain a large plate suitable for large current discharges.

Further, the capacitance of conventional active carbon polarizable electrodes when there is a strong discharge is less than half that when there is a weak discharge. Accordingly, the active carbon polarizable electrode of the conventional art presents a disadvantage in the case of strong discharges, and is not suitable for supplying a large current such as would be necessary for an auxiliary battery in a car.

SUMMARY OF THE INVENTION

Accordingly, it is an object of the present invention to provide an active carbon electrode which is of sufficient mechanical strength to be formed into a large plate, may be suitably used as an electrical double layer condenser capable of a large current discharge, and which can realize a high capacitance.

The method for producing an active carbon electrode for use as an electrical double layer condenser according to a first aspect of the present invention is characterized in comprising the steps of:

a) producing a carbon base material by carrying out a first activation treatment to a carbon material obtained by carbonization of a carbon compound;

b) producing a formed body by adding a binder to the carbon base material;

c) carbonizing the formed body; and d) producing an active carbon electrode by carrying out a second activation treatment to the carbonized formed body.

In the production method as structured above, by selecting the temperature and duration of the treatments so that the activation yield from the first and second activations attains a specific value, an excellent plate suitable for an electrode can be formed, and an active carbon electrode having a specified specific surface area can be obtained. Thus, a superior electrode for use as an electrical double layer condenser having a large capacitance can be obtained.

A method for producing an active carbon electrode for use in an electrical double layer condenser according to a second aspect of the present invention is characterized in comprising the steps of:

a) producing a carbon base material by carrying out a first oxidation treatment to a carbon material obtained by carbonization of a carbon compound;

b) producing a formed body by adding a binder to the carbon base material;

c) carbonizing the formed body;

d) carrying out a second oxidation treatment to the carbonized formed body; and e) producing an active carbon electrode by carrying out an activating heat treatment to the formed body which has been oxidized a second time.

In the production method as structured above, variations in weight are caused by the second oxidation treatment and the activating heat treatment, however, the temperature and duration of the treatments may be selected so that the heat treatment yield attains a specific value. As a result, an active carbon electrode can be obtained which has no bends or cracks, and which has excellent capabilities for the purpose of supplying a large current. Accordingly, in regard to a high current density, the present invention provides for an active carbon electrode for use as an electrical double layer condenser which has a high capacitance not available in the conventional art.

The method for producing an active carbon electrode for use as an electrical double layer condenser according to a third aspect of the present invention is characterized in comprising the steps of:

a) performing an activation treatment to a carbon material obtained by carbonization of a carbon compound, and grinding the activated carbon material to produce an active carbon base material having an average particle diameter of not more than 10 μm;

b) producing a formed body by adding a binder to the active carbon base material and forming into a plate-shape; and c) making an active carbon plate by carbonizing the formed body.

By means of the production method as structured above, it is possible to obtain an active carbon electrode for use as an electrical double layer condenser having a high capacitance.

The method of production of an active carbon electrode for use in an electrical double layer condenser according to a fourth aspect of the present invention is characterized in comprising the steps of:

a) carrying out an activation treatment to a carbon material obtained by carbonizing a carbon compound, and grinding the activated carbon material to produce an active carbon base material having an average particle diameter of not more than 10 μm;

b) producing a formed body by adding a binder to the active carbon base material and forming into a plate-shape;

c) making an active carbon plate by carbonizing the formed body; and d) carrying out another activation treatment to the active carbon plate.

In a production method as structured above, it is possible to achieve a high capacitance because of the combined effects obtained from the particle diameter in the active carbon base material and the second activation treatment.

BRIEF DESCRIPTION OF THE DRAWINGS

FIG. 14 is a diagram which explains the conventional process for producing active carbon and an active carbon electrode.

FIG. 15 is a diagram which explains the conventional process for producing active carbon and an active carbon electrode.

FIG. 16 is a diagram which explains the conventional process for producing active carbon and an active carbon electrode.

DESCRIPTION OF THE PREFERRED EMBODIMENTS

The method for producing an active carbon electrode for use as an electrical double layer condenser according to the first aspect of the present invention is characterized in comprising the steps of:

a) producing a carbon base material by carrying out a first activation treatment to a carbon material obtained by carbonization of a carbon compound;

b) producing a formed body by adding a binder to the carbon base material;

c) carbonizing the formed body; and d) producing an active carbon electrode by carrying out a second activation treatment to the carbonized formed body.

Coconut shell char, wood, coal, pitch, natural macromolecules, synthetic macromolecules and the like may be used as the aforementioned carbon compound, however, phenol resin is preferably employed.

Further, for preparing the aforementioned binder, a phenol resin powder is dissolved in the mixture of an organic solvent and a lipophilic liquid. As the organic solvent, for example, alcohols, or the class of ketones such as acetone, and cyclohexanone can be used. As the lipophilic liquid, creosote oil, coal tar, anthracene oil, kerosene, liquid paraffin, ethylene glycol, glycerin or the like, can be used.

In the production method of the present invention, "activation treatment" indicates heat treating a material in at least one of a carbon dioxide atmosphere, a steam atmosphere, and an atmosphere of carbon dioxide and steam. In the present invention, the temperature and duration of the heat treatment in the second activation treatment are selected so that the activation yield from the second activation treatment exceeds 75%. The activation yield is obtained according to the following formula (i):

$$\text{activation yield (\%)} = \frac{\text{weight after activation}}{\text{weight before activation}} \times 100$$

The method is further characterized in that the total activation yield is from 70% to 95% and is obtained according to the following formula (ii):

$$\text{total activation yield (\%)} = \frac{\text{activation yield from first activation} \times \text{activation yield from second activation}}{100}$$

Further, in the active carbon electrode for use as an electrical double layer condenser, the active carbon electrode produced by the above method is characterized in having a specific surface area of 600 to 1500 $m^2/g$.

In the case of an active carbon formed body produced by the conventional method (FIG. 15), wherein a binder such as phenol resin or the like is used to form an activated active carbon base material into a plate-shaped electrode with carbonization then being carried out, the activity of the active carbon formed body may fall below that of the base material. On the other hand, as shown in FIG. 16, when activation is performed only once after the production of the active carbon base material and sintering, the ability to form into a plate-shaped formed body is poor.

Figure 1:
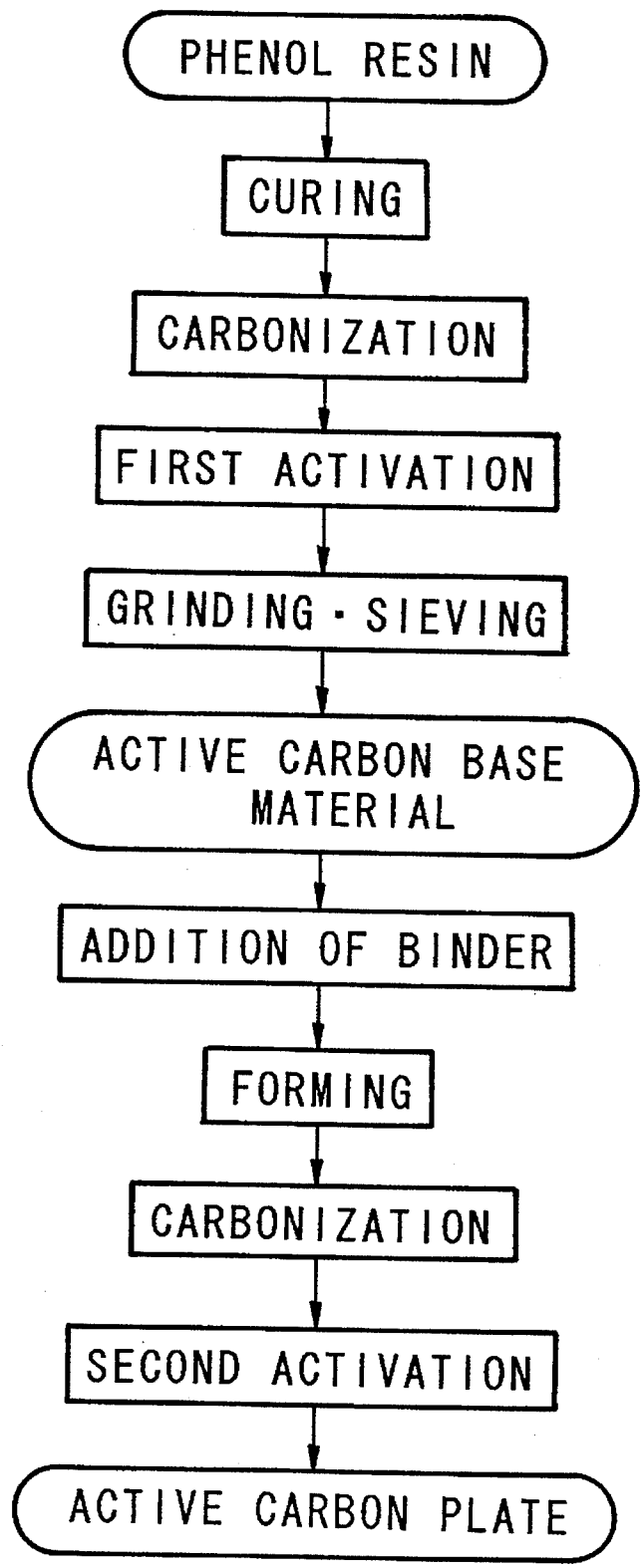
FIG. 1 is a process diagram showing an example of the method for producing an active carbon electrode according to a first aspect of the present invention.

Accordingly, it became clear that an active carbon electrode for use as an electrical double layer condenser could not be produced employing just one activation process. Rather, as shown in FIG. 1, it is essential to carry out another activation (second activation) after a binder has been used to form a pre-activated (i.e., undergone first activation) active carbon base material into the form of a plate-shaped electrode and the binder and the like have been carbonized. Further, by relying on a trial and error method to repeatedly vary the conditions for the activation, it was discovered that the activation yield is an extremely important factor influencing not only formability, but also capacitance.

To begin with, in the second activation treatment, the activation treatment yield shown by the above formula (i) has a large effect on formability. If the yield value does not exceed 75%, it is not possible to achieve good forming of the base material into an electrode.

Further, by selecting the temperature and duration of the heat treatment so that the total activation yield, which is the product of the first and second activation yields, falls within the range of 70% to 95%, a high capacitance of a stable value can be obtained. Further, when the specific surface area is within the range of 600 to 1500 $m^2/g$, an active carbon electrode having a stable and high capacitance can be obtained.

Accordingly, in the production process for this active carbon electrode, by controlling the activation yield and the specific surface area, a high quality active carbon electrode which has excellent formability and high capacitance can be obtained.

The method for producing an active carbon electrode for use as an electrical double layer condenser according to a second aspect of the present invention is characterized in comprising the steps of:

a) producing a carbon base material by carrying out a first oxidation treatment to a carbon material obtained by carbonization of a carbon compound;

b) producing a formed body by adding a binder to the carbon base material;

c) carbonizing the formed body;

d) carrying out a second oxidation treatment to the carbonized formed body; and e) producing an active carbon electrode by carrying out an activating heat treatment to the formed body which has been oxidized a second time.

"Oxidation treatment" here indicates a heat treatment in an air or mixed gas atmosphere including oxygen, at a temperature not less than 200° C., and preferably in the range of 300° C. to 400° C. Further, "activating heat treatment" here indicates a heat treatment in an inactive gas atmosphere such as nitrogen, at a temperature not less than 700° C., preferably in the range of 800° C. to 1000° C., and most preferably at 900° C. In regard to weight variations caused by the activating heat treatment and the second oxidation treatment in the present invention, the temperature and duration are selected so that the heat treatment yield is in the range of 70% to 95%. The heat treatment yield is indicated by the following formula (iii):

$$\text{heat treatment yield (\%)} = \frac{\text{weight after activating heat treatment of formed body}}{\text{weight after carbonization of formed body}} \times 100$$

Further, the present invention's active carbon electrode for use as an electrical double layer condenser produced by the above method is characterized in having a specific surface area of 600 to 1100 $m^2/g$.

In second aspect of the present invention, in place of activation carried out using an activation treatment in at least one of a carbon dioxide atmosphere, a steam atmosphere, and an atmosphere of carbon dioxide and steam, a material is mainly activated using an oxidation treatment wherein the active carbon base material is heat treated in air, and then undergoes a second oxidation treatment. The thus treated material is then activated by heat treating it in an inactive gas atmosphere such as nitrogen or the like. Further, with regard to the weight variations caused by the second oxidation treatment and the activating heat treatment in the production process, by selecting the temperature and duration of the treatments so that the heat treatment yield indicated by the above formula (i) is in the range of 70% to 95%, it is possible to obtain an active carbon electrode which has no bends or cracks and which has excellent capabilities for use in supplying a large current. The BET specific surface area of the thus obtained active carbon electrode is in the range of 600 to 1100 $m^2/g$.

In the method for producing an active carbon electrode for use as an electrical double layer condenser according to the third aspect of the present invention is characterized in comprising the steps of:

a) performing an activation treatment to a carbon material obtained by carbonization of a carbon compound, and grinding the activated carbon material to produce an active carbon base material having an average particle diameter of not more than 10 μm;

b) producing a formed body by adding a binder to the active carbon base material and forming into a plate-shape; and c) making an active carbon plate by carbonizing the formed body.

The method of production for an active carbon electrode for use in an electrical double layer condenser according to a fourth aspect of the present invention is characterized in comprising the steps of:

a) carrying out an activation treatment to a carbon material obtained by carbonizing a carbon compound, and grinding the activated carbon material to produce an active carbon base material having an average particle diameter of not more than 10 μm;

b) producing a formed body by adding a binder to the active carbon base material and forming into a plate-shape;

c) making an active carbon plate by carbonizing the formed body; and d) carrying out another activation treatment to the active carbon plate.

In this method, it is-preferable to form an active carbon base material having an average particle diameter of not more than 10 μm by grinding after performing the first activation treatment to a carbon material obtained by carbonization of a carbon compound. Binder is then added to the active carbon base material, which is then formed into a plate-shape to produce a formed body. After carbonizing the formed body, a second activation treatment is then carried out.

An activation treatment using a heat treatment in at least one of a carbon dioxide atmosphere, a steam atmosphere, and an atmosphere of carbon dioxide and steam can be employed as the first and second activation treatments.

Alternatively, it is even more effective to carry out an oxidation treatment in air as the first and second activation treatments. The oxidation treatment in air may be carried out via a heat treatment. Further, when an oxidation treatment has been carried out in air for the second activation treatment, it is preferable to carry out a heat treatment in an inactive gas as an additional treatment.

As the result of extensive research and repeated trial and error, the inventors of the present invention discovered that in the production process for the conventional active carbon electrode shown in FIG. 14, when the average particle diameter of the active carbon base material is not more than 10 μm, an active carbon electrode having a high capacitance can be realized, while when the average particle diameter exceeds 10 μm, the capacitance drops significantly.

In other words, in the present invention's production method for an active carbon electrode for use as an electrical double layer condenser, by making the average particle diameter of the active carbon base material not more than 10 μm, the activity of the base material is not damaged when the binder is added to the active carbon base material, and the active carbon base material is then formed and carbonized. Accordingly, it is possible to control the drop in capacitance which is caused when the activity of the base material is impaired.

Further, when an active carbon base material having an average particle diameter of not more than 10 μm is formed by grinding an activated carbon material obtained by carbonization of a carbon compound and a first activation treatment, a binder is added to the active carbon base material which is then formed into a plate shape to produce a formed body, and a second activation treatment is then performed after carbonization of the formed body, a high capacitance can be obtained as a result of the additive effects obtained from the particle diameter of the active carbon base material and the second activation treatment.

The activation treatment can be carried out by means of a heat treatment in at least one of a carbon dioxide atmosphere, a steam atmosphere, and an atmosphere of carbon dioxide and steam. Alternatively, if an oxidation treatment in air is carried out for the activation treatment, the capacitance level can be made even higher.

EMBODIMENTS

The present invention will now be explained in even greater detail using preferred embodiments. The production of an active carbon electrode in which phenol resin was employed as the source material according to the production process shown in FIG. 1. Embodiment 1 below examines the effects of an activation treatment in a carbon dioxide gas atmosphere, while Embodiment 2 below examines the effects of an activation treatment in a steam atmosphere.

Experiments (1) through (11) in Embodiment 1 examine the effects of varying the temperature and duration of the first and second activation treatments. Further, results for comparative purposes were obtained from experiments (12) through (14) in which the second activation treatment was not carried out, and from example (15) in which the first activation treatment was not carried out.

Embodiment 1

Activation in carbon dioxide gas atmosphere

Experiment 1

A novolak type phenol resin was cured at 160° C. and then ground into an approximately 2 mm square cubes. The cubes were placed in nitrogen gas and underwent carbonization by heat treating for 30 minutes at 900° C. The first activation was then carried out by heating the carbonized cube for one hour at 900° C. in carbon dioxide gas, to obtain an active carbon base material in the form of granules having a specific surface area of 650 $m^2/g$. The yield from this first activation (=weight after activation/weight before activation) was 92%.

This granular active carbon base material was ground to create a powder with an average particle diameter of 8 μm. To 100 parts by weight of this powder was added a binder in the amount of 43 parts by weight consisting of 15 parts phenol resin, 8 parts ethanol, and 20 parts creosote. The mixture was kneaded and pressed at a pressure of 500 kg/$cm^2$ to form a formed body in the form of a 50×50×1 mm plate.

The obtained formed body was placed in nitrogen gas and the temperature was increased 100° C./hr to 900° C. where it was maintained for 30 minutes to carry out the carbonization treatment. The gas was then placed in carbon dioxide gas and the second activation was carried out by heat treating for 10 hours at 800° C. The activation yield (=weight after activation/weight before activation) was 93%. Accordingly, the total activation yield was 92×93/100= 86%. The BET specific surface area was measured for the obtained formed body and found to be 740 m²/g.

Figure 2:
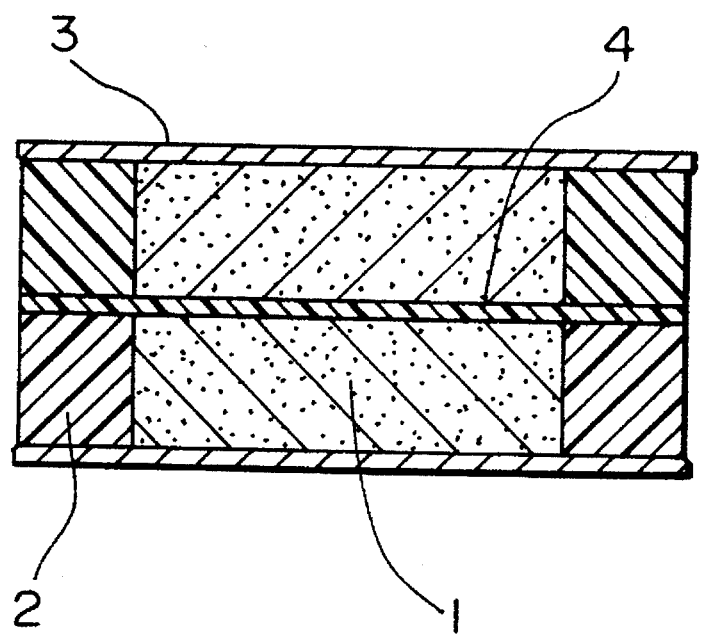
FIG. 2 is a cross-sectional diagram of the active carbon electrode produced in an embodiment of the present invention.

There were no bends or cracks caused in the formed body by the second activation treatment. Two circular plates 14 mmφ, (thickness 1 mm) were then cut from the formed body, and impregnated with a 30 weight % sulfur solution in a vacuum to form the measurement cell shown in FIG. 2. The capacitance was obtained. In FIG. 2, the numerals 1, 2, 3, and 4 indicate respectively, an active carbon electrode, gasket, collector electrode and separator. The capacitance C was, in general, discharged at a fixed current I after charging. The time Δt required for the voltage to drop from voltage V1 to voltage V2 was measured and can be obtained by the following formula (iv):

$$C = I \times \Delta t / (V1 - V2) \quad \text{(iv)}$$

After charging for 24 hours at 900 mV, discharging was carried out at 4 mA/cm². After further charging for 2 hours, discharging was carried out at 400 mA/cm². Then, with V1=540 mV and V2=360 mV. A capacitance of 61 F/cm³ was obtained at a current of 4 mA/cm², while a capacitance of 26 F/cm³ was obtained at a current of 400 mA/cm².

Experiments 2-11

The duration and temperature of the first and second activation treatments in Experiment 1 were varied, and the effect on formability and capacitance was examined. Results, including those for Experiment 1, are shown in Table 1.

Experiment 12

The formed body obtained in Experiment 1 underwent carbonization under the same conditions as set forth in Experiment 1. Two 14 mmφ (thickness 1 mm) circular plates were cut from the formed body without carrying out a second activation treatment. Capacitance was measured in the same way as in Experiment 1. These results are also shown in Table 1.

Experiment 13

With the exception of carrying out the first activation for 2 hours, capacitance was measured in the same way as in Experiment 12. These results are shown in Table 1.

Experiment 14

With the exception of carrying out the first activation for 3 hours, capacitance was measured in the same way as in experiment (12). These results are shown in Table 1.

Experiment 15

With the exception that the first activation was not carried out, an active carbon electrode was obtained and capacitance was measured in the same way as in Experiment 1. These results are shown in Table 1.

TABLE 1

| sample no. | first activation treatment | | | second activation treatment | | | specific surface area | total yield | formability | capacitance F/cm³ | |
|---|---|---|---|---|---|---|---|---|---|---|---|
| | temp °C. | time h | yield % | temp °C. | time h | yield % | m²/g | % | | 4 mA/cm² | 400 mA/cm² |
| (1) | 900 | 1 | 92 | 800 | 10 | 93 | 740 | 86 | excellent | 61 | 26 |
| (2) | 900 | 1 | 92 | 800 | 20 | 84 | 1080 | 77 | excellent | 59 | 25 |
| (3) | 900 | 2 | 80 | 800 | 20 | 83 | 1770 | 66 | excellent | 50 | 17 |
| (4) | 900 | 1 | 95 | 800 | 31 | 76 | 1370 | 72 | excellent | 59 | 25 |
| (5) | 900 | 1 | 95 | 900 | 2.5 | 75 | 1450 | 71 | excellent | 58 | 24 |
| (6) | 900 | 1 | 95 | 900 | 2.6 | 73 | 1700 | 67 | bends, cracks | — | — |
| (7) | 900 | 2.5 | 75 | 800 | 20 | 84 | 1950 | 63 | excellent | 43 | 10 |
| (8) | 900 | 2.7 | 72 | 800 | 10 | 93 | 1650 | 68 | excellent | 52 | 20 |
| (9) | 800 | 1 | 99 | 800 | 1 | 99 | 550 | 98 | excellent | 45 | 9 |
| (10) | 800 | 1 | 99 | 800 | 2 | 98 | 570 | 97 | excellent | 51 | 16 |
| (11) | 800 | 2 | 98 | 800 | 4 | 97 | 600 | 95 | excellent | 57 | 24 |
| (12) | 800 | 1 | 92 | — | — | — | — | — | excellent | 49 | 16 |
| (13) | 800 | 2 | 80 | — | — | — | — | — | excellent | 50 | 17 |
| (14) | 800 | 3 | 70 | — | — | — | — | — | excellent | 48 | 15 |
| (15) | — | — | — | 900 | 2.3 | 74 | — | — | cracks, brittle | — | — |

In Experiments 1 through 11 in Table 1 above, first and second activations which are essential elements in the production method according to the first aspect of the present invention are carried out under varying conditions. For the second activation, it was observed that formability into a plate shape tended to become worse when the activation yield fell. In Experiments 4 and 5, the second activation yields were, respectively, 76% and 75%, and very little bending to the extent that would not interfere with practical utilization could be noted. In Experiment 6, the second activation yield was 73%, with cracking and bending occurring such that a plate-shaped formed body could not be obtained. From these results, it was determined that at second activation yields of 75% or more, forming into a plate shaped electrode form was possible, while at second activation yields of less than 75%, sufficient formability could not be obtained. In Experiment 15, in which the first activation was not carried out, cracking and brittleness occurred and forming into a plate shape was not possible.

Figure 3:
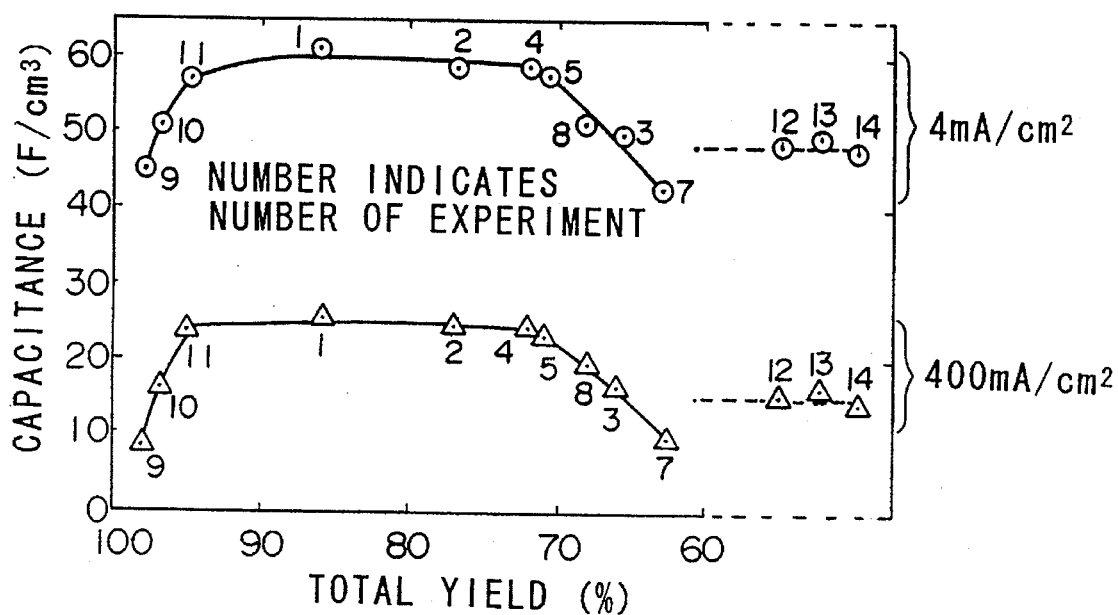
FIG. 3 is a graph which displays the results of embodiment 1 of the present invention and shows the relationship between activation yield and capacitance of an active carbon electrode produced by carbon dioxide gas activation.

The capacitance of the formed product which was formed into a plate-shaped electrode is shown in FIG. 3 as a function of total yield. In this figure, the points connected by the solid line indicate experiments in which the first and second activations were carried out. In these experiments, for both the 4 mA/cm$^2$ and 400 mA/cm$^2$ currents, a high capacitance was displayed when the total yield was in the range of 70% to 95%. However, when the yield was less than 70%, or exceeded 95%, the capacitance fell.

The points connected by the broken line in FIG. 3 indicate Experiments 12 through 14 in which the second activation was not performed. In these experiments the capacitance was low.

Experiments 17–22

The temperature and duration of the first and second activation treatments in Experiment 16 were varied and the effects on formability and capacitance were examined. These results are shown together with those of Experiment 16 in Table 2.

Experiments 23 and 24

In these experiments, the conditions for the first activation in a steam atmosphere were varied, while the second activation was not carried out. With these exceptions, Experiments 23 and 24 were carried out in the same manner as in Experiment 16. As formability into a plate shape was excellent, capacitance was measured to yield the results shown in FIG. 2.

TABLE 2

| sample no. | first activation treatment | | | second activation treatment | | | specific surface area | total yield | formability | capacitance F/cm$^3$ | |
| --- | --- | --- | --- | --- | --- | --- | --- | --- | --- | --- | --- |
| | temp °C. | time h | yield % | temp °C. | time h | yield % | m$^2$/g | % | | 4 mA/cm$^2$ | 400 mA/cm$^2$ |
| (16) | 800 | 3.5 | 94 | 800 | 9 | 85 | 970 | 80 | excellent | 58 | 22 |
| (17) | 800 | 2 | 97 | 800 | 2 | 97 | 620 | 94 | excellent | 56 | 21 |
| (18) | 800 | 5 | 92 | 800 | 15.5 | 76 | 1500 | 70 | excellent | 55 | 20 |
| (19) | 750 | 2 | 98 | 750 | 1 | 99 | 570 | 97 | excellent | 37 | 11 |
| (20) | 800 | 10 | 83 | 800 | 15 | 76 | 1920 | 63 | excellent | 39 | 7 |
| (21) | 800 | 5 | 92 | 800 | 15.5 | 74 | 1620 | 68 | bends, cracks | — | — |
| (22) | 750 | 5 | 95 | 800 | 16.5 | 72 | — | 68 | bends, cracks | — | — |
| (23) | 800 | 8.5 | 89 | — | — | — | — | — | excellent | 50 | 14 |
| (24) | 800 | 16 | 73 | — | — | — | — | — | excellent | 49 | 13 |

Embodiment 2

Activation in a steam atmosphere

In this embodiment, the first and second activation treatments were carried out in a steam atmosphere according to the production process shown in FIG. 1. Experiments 16 through 22 examined the effect of varying the duration and temperature of the first and second activation treatments. Experiments 23 and 24 provide comparative results for the case where the second activation treatment was not carried.

Experiment 16

A novolak type phenol resin was cured and carbonized in the same manner as in Experiment 1. The first activation was carried out by heat treating for 3.5 hours at 800° C. in a steam atmosphere to obtain a granular active carbon base material with a specific surface area of 620 m$^2$/g. The first activation yield was 94%.

The granular active carbon base material was ground to an average particle diameter of 8 μm. Binder was then added and the base material was formed in the same way as in Experiment 1 to obtain an excellent formed body. The molded body then underwent carbonization. Activation was carried out by heat treating for 9 hours at 800° C. in a steam atmosphere. The activation yield was 85%. Total yield, therefore, was 94×85/100= 80%. The BET specific surface area was measured and found to 970 m$^2$/g. The capacitance was also measured in the same manner as in Experiment 1 and found to be 58 F/cm$^3$ at 4 mA/cm$^2$ and 22 F/cm$^3$ at 400 mA/cm$^2$.

In Experiments 16 through 22 in Table 2 above, first and second activations which are essential elements in the production method of the present invention are carried out under varying conditions. For the second activation, it was observed that formability into a plate shape tended to become worse when the activation yield fell. In Experiments 21 and 22, where the second activation yields did not reach 75% but rather were 74% and 72% respectively, bending and cracking occurred, making it impossible to obtain a plate-shaped formed body. According, it may be understood that at second activation yields of less than 75%, sufficient formability cannot be obtained.

Figure 4:
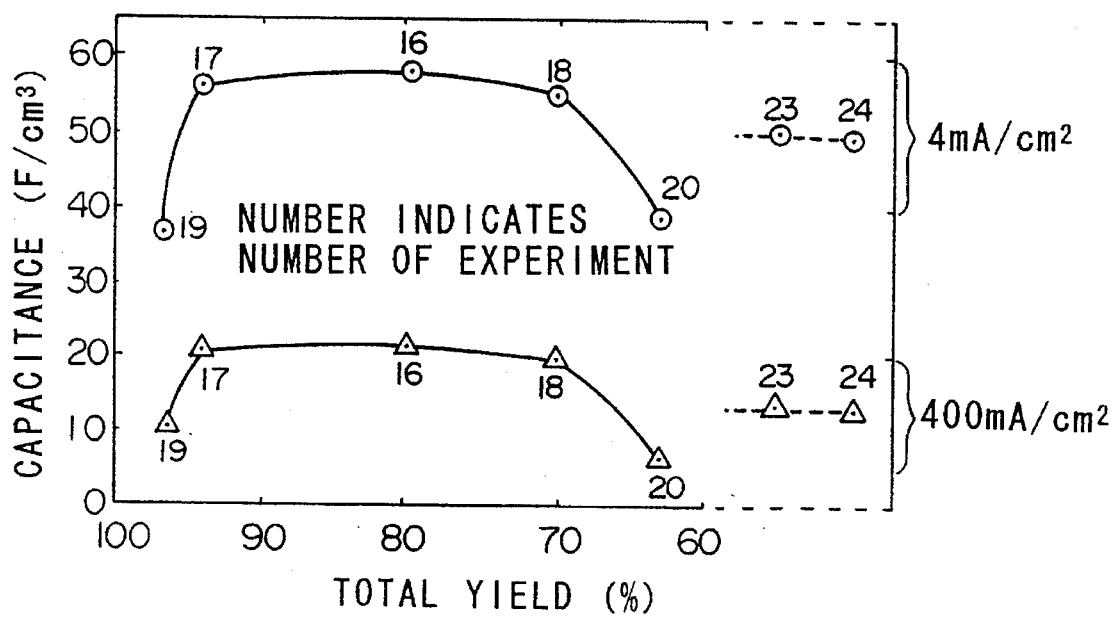
FIG. 4 is a graph which displays the results of embodiment 2 of the present invention and shows the relationship between activation yield and capacitance of an active carbon electrode produced by steam activation.

The capacitance of the formed product formed into a plate-shaped electrode is shown in FIG. 4 as a function of total yield. In this figure, the points connected by the solid line indicate experiments in which the first and second activations were carried out. In these experiments, for both the 4 mA/cm$^2$ and 400 mA/cm$^2$ currents, a high capacitance was displayed when the total yield was in the range of 70% to 95%. However, when the yield was less than 70%, or exceeded 95%, the capacitance fell.

The points connected by the broken line in FIG. 4 indicate Experiments 23 and 24 in which the second activation was not performed. In these experiments the capacitance was even lower.

Figure 5:
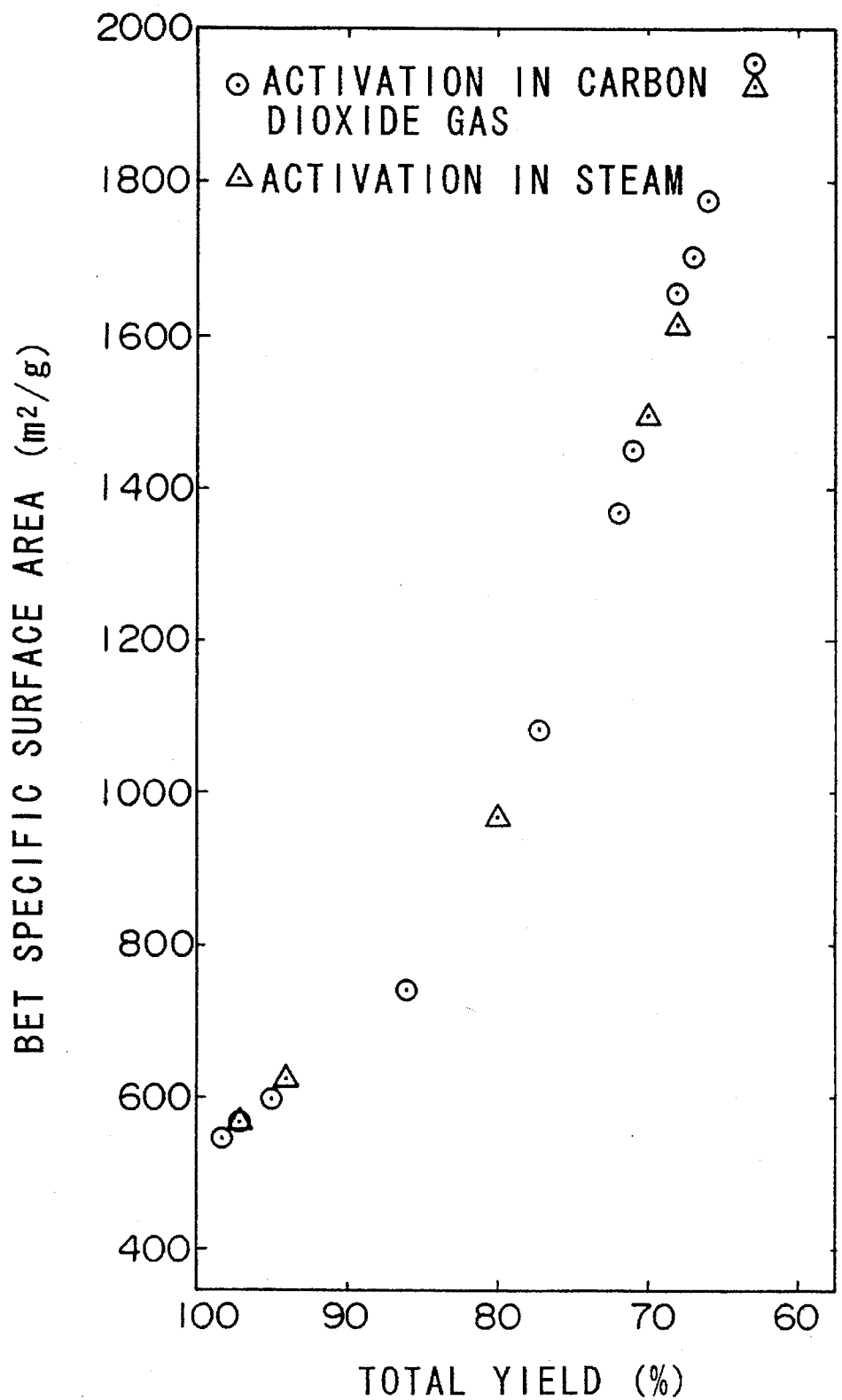
FIG. 5 is a graph which displays the results of embodiment 2 of the present invention and shows the relationship between BET specific surface area and capacitance of the produced active carbon electrode.

Further, as shown in FIG. 5, the BET specific surface area becomes smaller as total yield increases. There was no difference noted between carrying out the activation treatment in a carbon dioxide gas atmosphere or a steam atmosphere. The BET specific surface area corresponding to total yields in the range of 70% to 95% which displayed excellent characteristics was from 600 to 1600 $m^2/g$.

Embodiment 3

Figure 6:
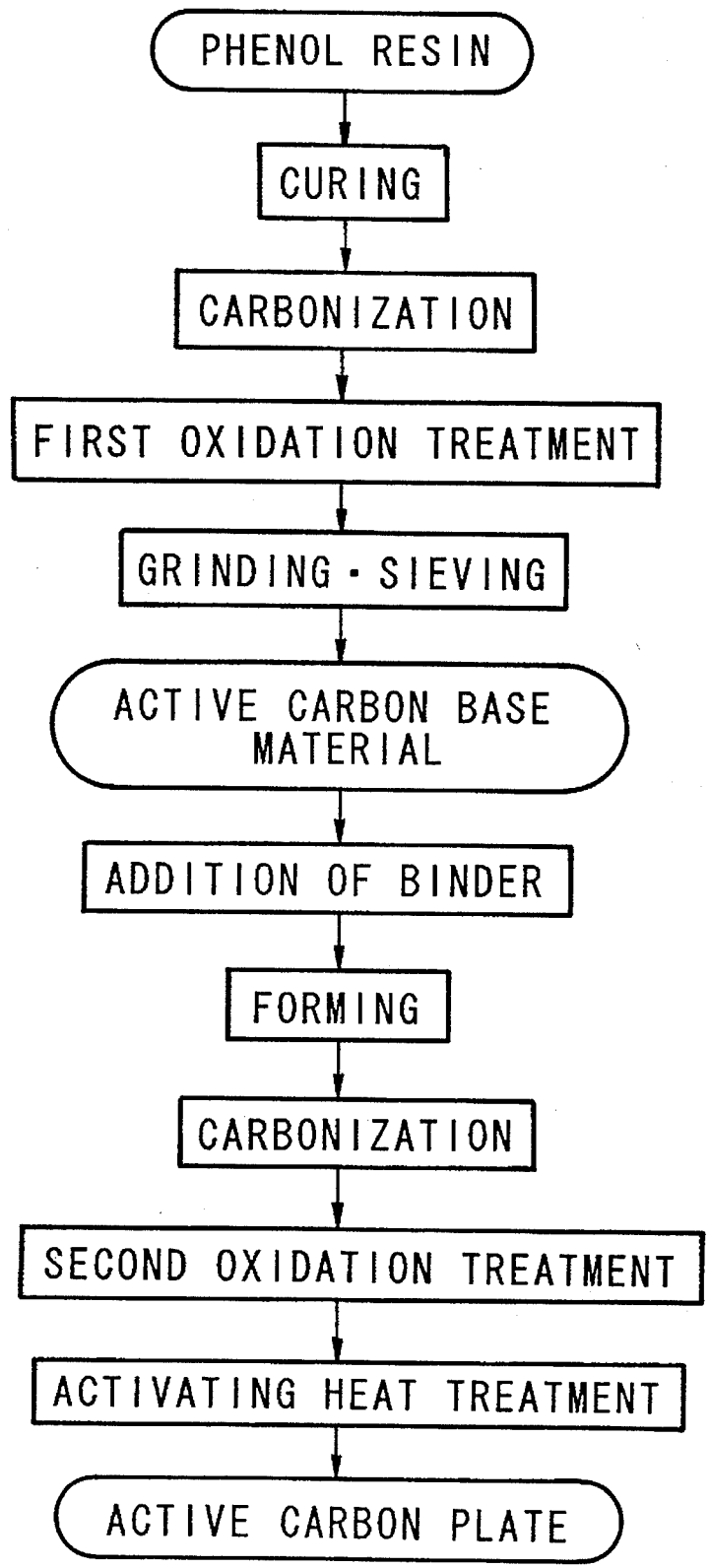
FIG. 6 is a process diagram showing an example of the method for producing an active carbon electrode according to a second aspect of the present invention.

Following the production process shown in FIG. 6, phenol resin was used as the source material, and underwent carbonization, a first oxidation treatment, and grinding and sieving to form an active carbon base material. After addition of a binder, the active carbon base material was formed to a formed body which was then underwent carbonization. The second oxidation treatment was then performed, followed by an activation treatment to form an active carbon plate (active carbon electrode). In the third embodiment (Experiments 1 through 9) of the production method of the second aspect of the present invention, in line with the production process shown in FIG. 6, the temperature and duration of the first and second oxidations in air were varied, and the effect on formability, heat treatment yield and capacitance were examined to obtain the optimal treatment conditions.

Further, in Comparative Examples 1 through 5, an active carbon electrode was produced without carrying out the first and second oxidation treatments. Capacitance values were then compared with those obtained with the active carbon electrode obtained in the embodiment (Experiments 1 through 9) of the production method of a second aspect of the present invention.

Experiment 1

A novolak type phenol resin was cured at 160° C. and then ground into an approximately 2 mm cube. This was placed in nitrogen gas and heat treated for 30 minutes at 900° C. The first oxidizing heat treatment in air was then carried out for one hour at 350° C., followed by grinding to an average particle diameter of 8 μm. To 100 parts by weight of this powder was added a binder in the amount of 43 parts by weight consisting of 15 parts phenol resin, 8 parts ethanol, and 20 parts creosote. The mixture was kneaded and then pressed at a pressure of 500 $kg/cm^2$ to produce a formed body in the form of a 50×50×1 mm plate.

The obtained formed body was placed in nitrogen gas and underwent heating at 900° C. for 30 minutes to carry out carbonization. The formed body was then placed in air and the second air oxidation treatment was carried out for 1 hour at 350° C. The temperature in the nitrogen atmosphere was then increased 100° C./hr to 900° C., and maintained for 30 minutes there, thereby carrying out the activating heat treatment. The heat treatment yield ((weight after activating heat treatment of formed body/weight after carbonization of formed body)×100) was 90%, while the BET specific surface area was 750 $m^2/g$.

There were no bends or cracks in the formed body after the activation treatment. Moreover, the formed body had sufficient mechanical strength. Two circular plates 14 mmφ (thickness 1 mm) were then cut from the formed body, and impregnated with a 30 weight % sulfur solution in a vacuum to form the measurement cell shown in FIG. 2. The capacitance was obtained. In FIG. 2, the numerals 1, 2, 3, and 4 indicate respectively, an active carbon electrode, gasket, collector electrode and separator. The capacitance C was, in general, discharged at a fixed current I after charging. The time Δt required for the voltage to drop from voltage V1 to voltage V2 was measured and can be obtained by the following formula (iv).

$$C = I \times \Delta t / (V1 - V2) \qquad (iv)$$

After charging for 24 hours at 900 mV, discharging was carried out at 4 $mA/cm^2$. After further charging for 2 hours, discharging was carried out at 400 $mA/cm^2$. Then, with V1 set to 540 mV and V2 set to 360 mV, a capacitance of 59 $F/cm^3$ was obtained at a current of 4 $mA/cm^2$, while at a capacitance of 28 $F/cm^3$ was obtained at a current of 400 $mA/cm^2$.

Experiments 2–9

The temperature and duration of the first and second air oxidation treatments in Experiment 1 were varied, and the effect on formability, heat treatment yield and capacitance were examined. These results are shown along with those for Experiment 1 in FIG. 3.

Comparative Example 1

With the exception that the second oxidation treatment in Experiment 1 was not carried out, an active carbon electrode was produced in the same way as in Experiment 1 and the capacitance was obtained. These results are shown in Table 3.

Comparative Examples 2 and 3

Varying only the conditions for the first oxidation treatment in Comparative Example 1, an active carbon electrode was produced in the same way as Experiment 1 and the capacitance was obtained. These results are shown in Table 3.

Comparative Examples 4 and 5

With the exception that the first oxidation treatment was not carried out and only the conditions for the second oxidation treatment were varied, an active carbon electrode was produced in the same way as in Experiment 1 and the capacitance was obtained. These results are shown in Table 3.

TABLE 3

| | first air oxidation | | second air oxidation | | heat treatment yield | specific surface area | capacitance (F/cm³) | |
|---|---|---|---|---|---|---|---|---|
| | temp (°C.) | time (h) | temp (°C.) | time (h) | (%) | (m²/g) | 4 mA/cm² | 400 mA/cm² |
| Experimental Example | | | | | | | | |
| 1 | 350 | 1 | 350 | 1 | 90 | 750 | 59 | 28 |
| 2 | 350 | 1 | 350 | 5 | 83 | 830 | 62 | 30 |
| 3 | 350 | 1 | 350 | 12 | 75 | 950 | 61 | 30 |
| 4 | 350 | 1 | 350 | 18 | 70 | 1025 | 59 | 28 |
| 5 | 350 | 0.6 | 350 | 0.4 | 95 | 600 | 57 | 27 |
| 6 | 330 | 0.6 | 330 | 0.4 | 97 | 570 | 50 | 21 |
| 7 | 330 | 0.4 | 330 | 0.4 | 98 | 490 | 45 | 15 |
| 8 | 350 | 4.5 | 350 | 20 | 68 | 1120 | 54 | 20 |
| 9 | 350 | 5.5 | 350 | 28 | 65 | 1180 | 46 | 12 |
| Comparative Example | | | | | | | | |
| 1 | 350 | 1.0 | — | — | — | | 50 | 18 |
| 2 | 350 | 2.5 | — | — | — | | 50 | 19 |
| 3 | 350 | 9.0 | — | — | — | | 52 | 20 |
| 4 | 380 | 7.0 | — | — | — | | 51 | 19 |
| 5 | — | — | 350 | 5 | 87 | | 48 | 18 |
| 6 | — | — | 380 | 6 | 80 | | 50 | 18 | note: cracking occurred in Experiment 9

Figure 7:
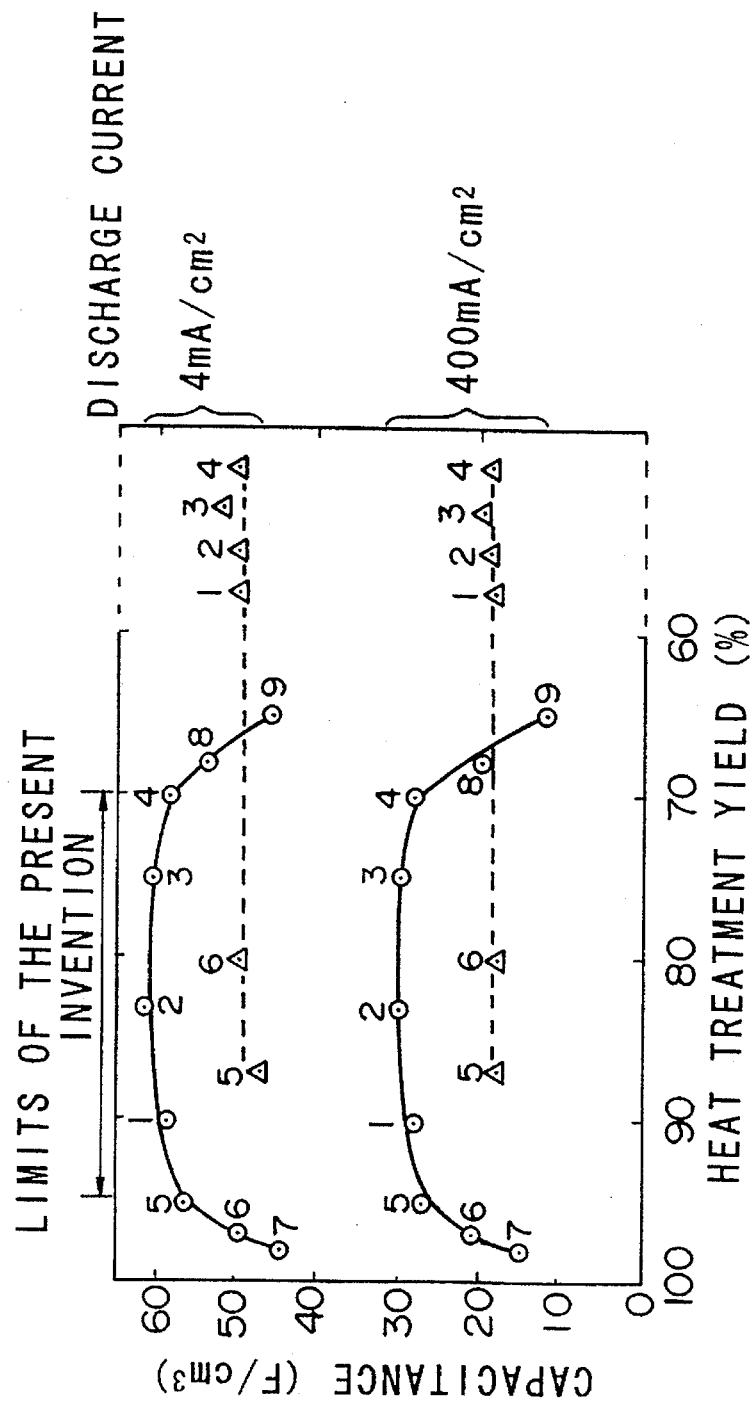
FIG. 7 is a graph which displays the results of embodiment 3 of the present invention and shows the relationship between activation yield and capacitance of the manufactured active carbon electrode.

When the data in Table 3 is plotted with the heat treatment yield on the horizontal axis and the capacitance on the vertical axis, the plot shown in FIG. 7 is obtained. As is clear from FIG. 7, a high capacitance is demonstrated when the heat treatment yield is in the range of 70% to 95%. In contrast, when the heat treatment yield falls below 70% or exceeds 95%, the capacitance drops quickly.

Figure 8:
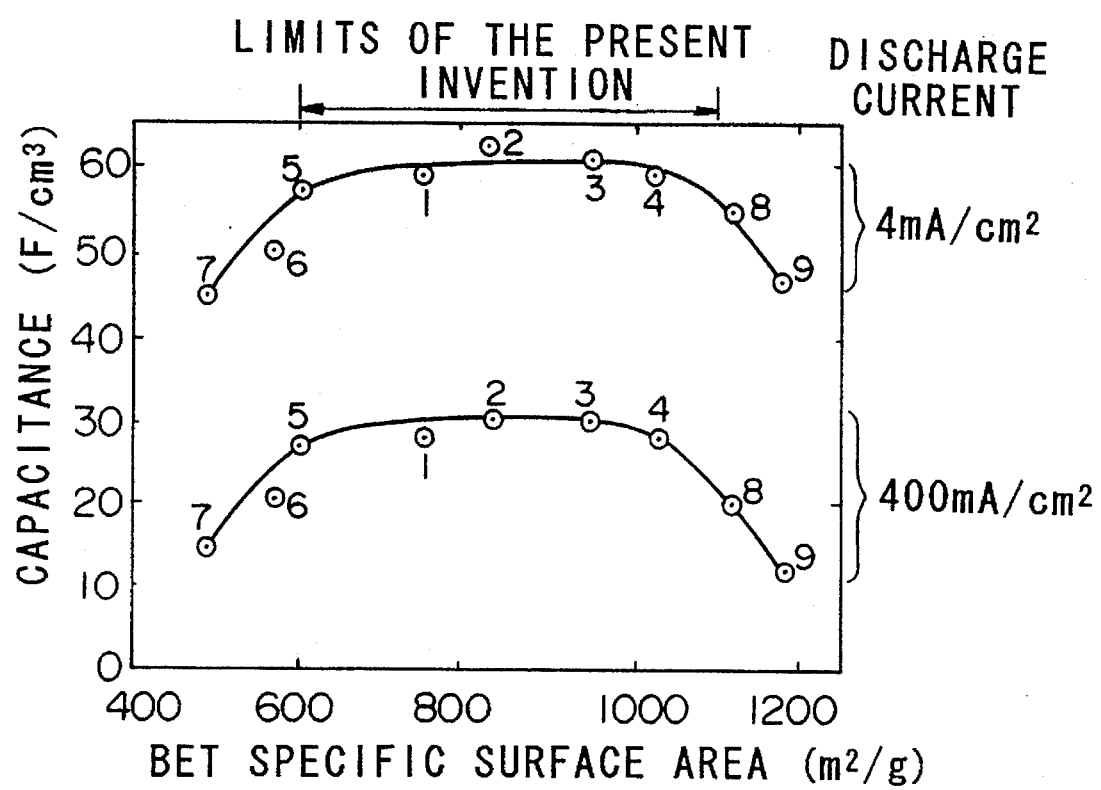
FIG. 8 is a graph which displays the results of embodiment 3 of the present invention and shows the relationship between BET specific surface area and capacitance of the manufactured active carbon electrode.

When the data in Table 3 is plotted with BET specific surface area on the horizontal axis and capacitance on the vertical axis, the plot in FIG. 8 is obtained. A high capacitance is observed when the BET specific surface area is within the limits of 600 to 1100 m²/g. In contrast, capacitance falls rapidly when the BET specific surface area drops below 600 m²/g or exceeds 1100 m²/g.

Embodiment 4

In the production process shown in FIG. 15, which is a production method according to a third aspect of the present invention, when obtaining an active carbon base material by grinding an activated carbon material, sieving is carried out so that the average particle diameter is not more than 10 μm, to produce an active carbon plate (active carbon electrode).

In this embodiment (experiments 10 through 15), the particle diameter in the active carbon base material was varied by changing the grinding time.

Further, for comparative purposes, a phenol resin in powder form was used in Comparative Example 7, and an active carbon electrode was produced without carrying out grinding.

Experiment 10

A novolak type phenol resin was cured at 160° C. and then ground into an approximately 2 mm cube. This was placed in nitrogen gas and heat treated for 30 minutes at 900° C. to carry out carbonization. Activation was then performed by heat treating for 1.5 hours at 900° C. in carbon dioxide gas.

Next, an active carbon base material was obtained by grinding for 30 hours in a vibrating ball mill. A particle size analyzer (microtrack) which employs a laser scattered light method was then used to measure the particle size, with the average particle diameter found to 0.7 μm.

To 100 parts by weight of the obtained active carbon powder was added 47 parts by weight of a binder comprising 15 parts phenol resin, 8 parts ethanol, and 20 parts creosote. The mixture was kneaded and then pressed at a pressure of 500 kg/cm² to produce a formed body in the form of a 50×50×1 mm plate.

The obtained formed body was placed in nitrogen gas and the temperature was raised 100° C./hr to 900° C. where it was maintained for 30 minutes to carry out carbonization thereby obtaining an active carbon plate (active carbon electrode).

Neither bends nor cracks could be discerned in the carbonized active carbon plate, which demonstrated good formability. Two circular plates 14 mmφ (thickness 1 mm) were then cut from the active carbon plate, and impregnated with a 30 weight % sulfur solution in a vacuum to make the measurement cell shown in FIG. 2. The capacitance was obtained. In FIG. 2, the numerals 1, 2, 3, and 4 indicate respectively, an active carbon electrode, gasket, collector electrode and separator.

The capacitance C was, in general, discharged at a fixed current I after charging. The time $\Delta t$ required for the voltage to drop from voltage V1 to voltage V2 was measured and can be obtained by the following formula (iv).

$$C = I \times \Delta t / (V1 - V2) \tag{iv}$$

After charging for 24 hours at 900 mV, discharging was carried out at 4 mA/cm². After further charging for 2 hours, discharging was carried out at 400 mA/cm². Then, V1 was set to 540 mV and V2 was set to 360 mV. A capacitance of 50.8 F/cm³ was obtained at a current of 4 mA/cm², while a capacitance of 22.1 F/cm³ was obtained at a current of 400 mA/cm².

Experiments 11–15

With the exception of varying the grinding time in the vibrating ball mill, active carbon base materials with a variety of average particle diameters were produced in the same way as in Experiment 10.

A binder having the same composition as in Experiment 10 was added to the obtained active carbon base materials in response to the average particle diameter therein. Molding in the same way as in Experiment 10 revealed good formability for all samples.

Discharge experiments were carried out in the same manner as in Experiment 10 on the obtained active carbon plate to obtain the capacitance.

The grinding time, average particle diameter, and amount of binder added in each experiment, and the capacitance values obtained are shown in Table 4 along with the results of Experiment 10.

Comparative Example 7

With the exceptions that a powdered phenol resin having an average particle diameter of 27 μm was employed as the source material and grinding was not carried out, an active carbon base material was obtained in the same way as in Example 1. The average particle diameter was measured and found to be 19.0 μm.

With the exception that the binder was added in the amount of 40.8 parts by weight, an active carbon plate was obtained in the same way as in experiment 10. Discharge experiments were carried out and the capacitance was obtained. These results are shown in Table 4.

Embodiment 5

Figure 9:
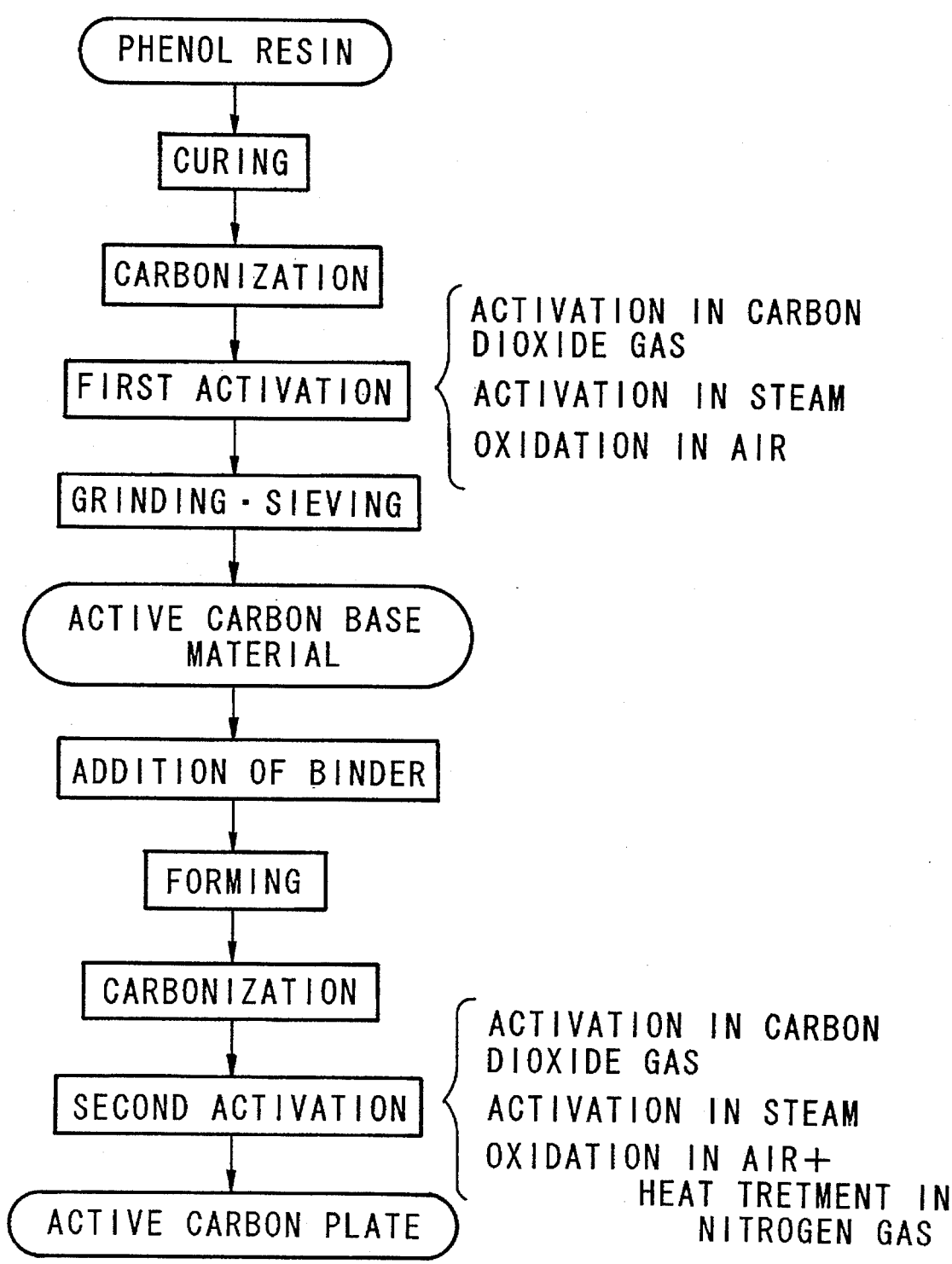
FIG. 9 is a process diagram showing an example of the method for producing an active carbon electrode according to a third aspect of the present invention.

In the production method of a fourth aspect of the present invention, as shown in FIG. 9, after forming and carrying out carbonization of an active carbon base material, a second activation treatment is carried out to produce an active carbon plate. The relationship between the particle diameter of the active carbon base material and capacitance was examined. Additionally, it is noted that in this embodiment, heat treatment in carbon dioxide gas was carried out as the first and second activations.

Further, as Comparative Example 8, an investigation was made in the same way for the case where a powdered phenol resin was employed as the source material.

Experimental Example 16

A carbonized product, which was obtained by forming an active carbon base material and carrying out the same processes as in Experimental example 10 through the step of carbonization, underwent a second activation by heat treating for 10 hours at 800° C. in carbon dioxide gas. The amount of binder added, however, was 47.2 parts by weight.

The capacitance was obtained in the same way as in Experimental example 10. These results are shown in Table 5.

Experimental Examples 17–21

With the exception of varying the grinding time in the vibrating ball mill, active carbon base materials with a variety of average particle diameters were produced in the

TABLE 4

|  | grinding time (h) | average particle diameter (μm) | binder amount added (parts) | capacitance (F/cm$^3$) | |
|---|---|---|---|---|---|
|  |  |  |  | 4 mA/cm$^2$ | 400 mA/cm$^2$ |
| Experimental Example 10 | 30 | 0.7 | 47.0 | 50.8 | 22.1 |
| Experimental Example 11 | 8 | 2.5 | 45.8 | 50.1 | 21.2 |
| Experimental Example 12 | 3 | 6.8 | 43.5 | 49.6 | 20.8 |
| Experimental Example 13 | 2 | 9.2 | 42.4 | 48.7 | 19.9 |
| Experimental Example 14 | 1 | 15.0 | 41.0 | 48.0 | 18.0 |
| Experimental Example 15 | 0.2 | 35.7 | 39.0 | 40.0 | 7.0 |
| Comparative Example 7 | — | 19.0 | 40.8 | 46.2 | 16.0 |

Example 7

Figure 10:
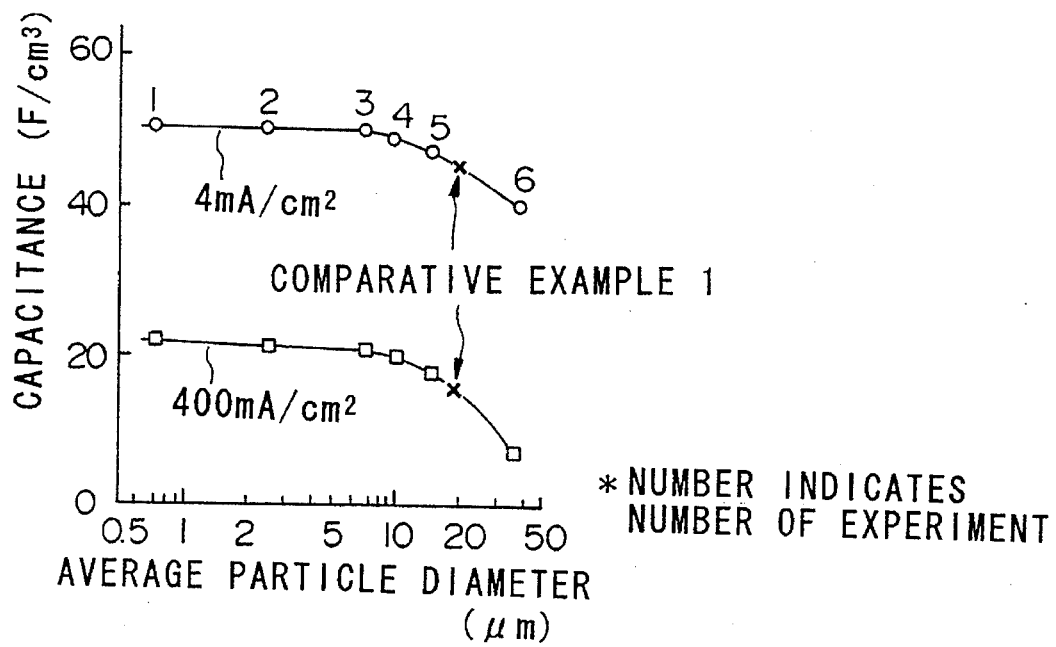
FIG. 10 is a graph which displays the results of embodiment 4 of the present invention and shows the relationship between capacitance of an active carbon electrode and average particle diameter in the active carbon base material.

Based on the results shown in Table 4, the relationship between the average particle diameter in the active carbon base material and capacitance are shown in the graph in FIG. 10. As is clear from this figure, a high capacitance is maintained when the average particle diameter is not more than 10 μm. However, when the average particle diameter exceeds 10 μm, the capacitance rapidly falls.

Additionally, although grinding is not necessary when using a powdered phenol resin as the source material as in Comparative Example 7, when the average particle diameter exceeds 10 μm, a high capacitance cannot be obtained.

same way as in Experimental example 16. A binder was added in response to the average particle diameter in the active carbon base material, and molding was performed. Capacitance values were then obtained in the same way as in Experimental example 10 for the obtained active carbon plate.

The grinding time, average particle diameter, and amount of binder added in each experimental example, and the capacitance values obtained are shown in Table 5.

Comparative Example 8

With the exception that a powdered phenol resin having an average particle diameter of 27 μm was employed as the source material and grinding was not carried out, an active carbon base material was obtained in the same way as in Example 16. The average particle diameter was measured and found to be 19.0 μm.

A binder was added in the amount of 40.8 parts by weight and an active carbon plate was obtained in the same way as in Experimental example 16. Discharge experimental examples were carried out as in Experimental example 10 and the capacitance was obtained. These results are shown in Table 5.

TABLE 5

|  | grinding time (h) | average particle diameter (μm) | binder amount added (parts) | capacitance (F/cm³) | |
|---|---|---|---|---|---|
|  |  |  |  | 4 mA/cm² | 400 mA/cm² |
| Experimental Example 16 | 30 | 0.7 | 47.2 | 62.0 | 28.0 |
| Experimental Example 17 | 10 | 2.2 | 46.1 | 60.8 | 26.9 |
| Experimental Example 18 | 4 | 5.2 | 44.0 | 60.0 | 25.3 |
| Experimental Example 19 | 1.5 | 11.0 | 42.0 | 59.1 | 24.3 |
| Experimental Example 20 | 0.5 | 22.5 | 40.1 | 52.0 | 17.8 |
| Experimental Example 21 | 0.2 | 34.8 | 39.5 | 47.6 | 14.5 |
| Comparative Example 8 | — | 19.0 | 40.8 | 54.0 | 20.0 |

Figure 11:
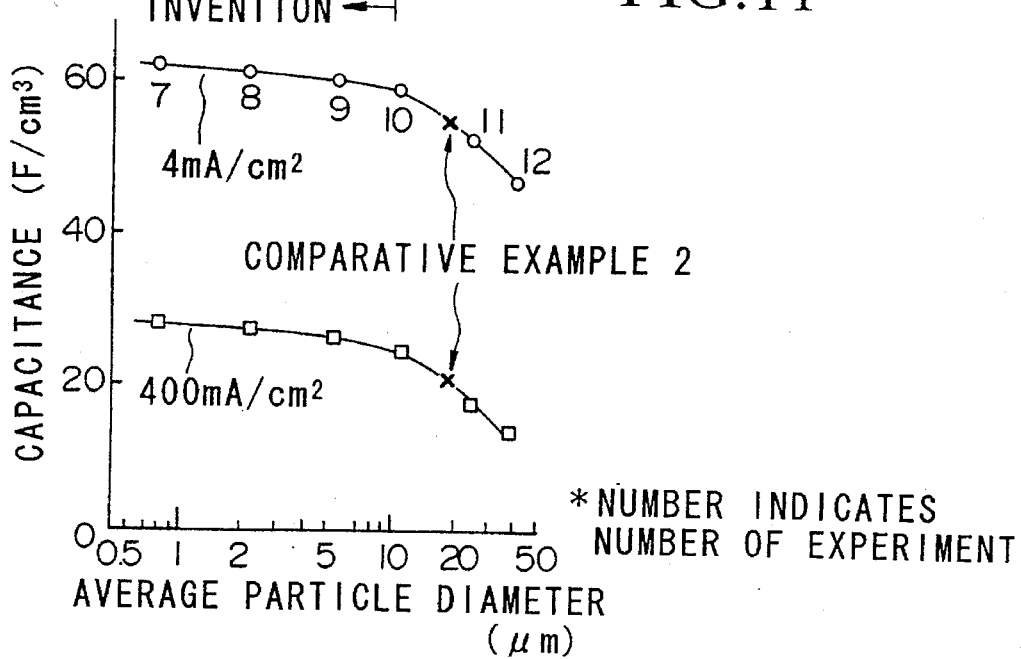
FIG. 11 is a graph which displays the results of embodiment 5 of the present invention and shows the relationship between capacitance of an active carbon electrode and average particle diameter in the active carbon base material.

From the results shown in Table 5, the relationship between the average particle diameter in the active carbon base material and capacitance are shown in the graph in FIG. 11. As is clear from this figure, a high capacitance is maintained when the average particle diameter is not more than 10 μm. However, when the average particle diameter exceeds 10 μm, the capacitance rapidly falls.

Additionally, although grinding is not necessary when using a powdered phenol resin as the source material as in Comparative Example 8, when the average particle diameter exceeds 10 μm, a high capacitance cannot be obtained.

Embodiment 6

Next, as a sixth embodiment of the present invention, heat treatment in steam was carried out as the first and second activation treatments in the process shown in FIG. 9, to produce an active carbon plate. The relationship between the particle diameter in the active carbon base material and capacitance was then examined.

Further, as Comparative Example 9, an investigation was made in the same way for the case where a powdered phenol resin was employed as the source material.

Experimental Example 22

With the exceptions that, in the process shown in FIG. 9, the first activation treatment involved heating for 3 hours at 800° C. in a steam atmosphere to obtain an active carbon base material having an average particle diameter of 0.8 μm, and the second activation treatment involved heat treating for 10 hours at 800° C. in a steam atmosphere, an active carbon plate was produced in the same way as in Experimental example 16. The amount of binder added, however, was 46.8 parts by weight.

The capacitance was obtained in the same way as in Experimental example 10. These results are shown in Table 6.

Experimental Examples 23–27

With the exception of varying the grinding time in the vibrating ball mill, active carbon base materials with a variety of average particle diameters were produced in the same way as in Experimental example 22. A binder was added in response to the average particle diameter in the active carbon base material, and molding was performed to obtain an active carbon plate. Capacitance values were obtained in the same way as in Experimental example 10.

The grinding time, average particle diameter, and amount of binder added in each experimental example, and the capacitance values obtained are shown in Table 6.

Comparative Example 9

With the exceptions that a powdered phenol resin having an average particle diameter of 27 μm was employed as the source material and grinding was not carried out, an active carbon base material was obtained in the same way as in Example 22. The average particle diameter was measured and found to be 18.5 μm.

A binder was added in the amount of 40.2 parts by weight and an active carbon plate was obtained in the same way as in Experimental example 22. Discharge experimental examples were carried out as in Experimental example 10 and the capacitance was obtained. These results are shown in Table 6.

TABLE 6

|  | grinding time (h) | average particle diameter (µm) | binder amount added (parts) | capacitance (F/cm³) | |
| --- | --- | --- | --- | --- | --- |
|  |  |  |  | 4 mA/cm² | 400 mA/cm² |
| Experimental Example 22 | 30 | 0.8 | 46.8 | 61.0 | 25.0 |
| Experimental Example 23 | 10 | 2.5 | 45.5 | 60.1 | 23.5 |
| Experimental Example 24 | 3 | 8.0 | 42.8 | 58.0 | 22.4 |
| Experimental Example 25 | 1.5 | 12.5 | 41.4 | 56.5 | 19.4 |
| Experimental Example 26 | 0.5 | 24.0 | 39.6 | 50.0 | 14.2 |
| Experimental Example 27 | 0.2 | 38.0 | 38.4 | 45.0 | 9.0 |
| Comparative Example 9 | — | 18.5 | 40.2 | 52.8 | 16.0 |

Figure 12:
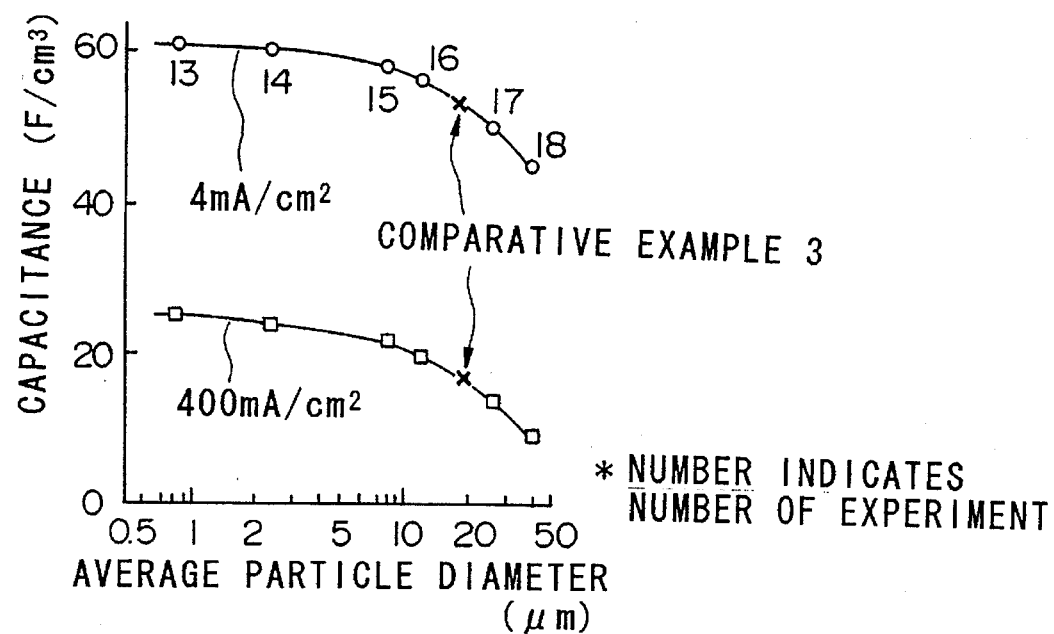
FIG. 12 is a graph which displays the results of embodiment 6 of the present invention and shows the relationship between capacitance of an active carbon electrode and average particle diameter in the active carbon base material.

From the results shown in Table 6, the relationship between the average particle diameter in the active carbon base material and capacitance are shown in the graph in FIG. 12. As is clear from this figure, a high capacitance is maintained when the average particle diameter is not more than 10 µm. However, when the average particle diameter exceeds 10 µm, the capacitance rapidly falls.

Further, when FIGS. 11 and 12 are compared, no large difference can be discerned between the results in the case where the first and second activation is carried out in carbon dioxide gas and the results in the case where the first and second activation is carried out in steam.

Additionally, although grinding is not necessary when using a powdered phenol resin as the source material as in Comparative Example 9, when the average particle diameter exceeds 10 µm, a high capacitance cannot be obtained.

Next, as the seventh example of the present invention, oxidizing heat treatment in air was carried out as the first and second activation treatments in the process shown in FIG. 9, after which heating in a nitrogen atmosphere was performed to produce an active carbon plate. The relationship between the particle diameter of the active carbon base material and capacitance was then examined.

Further, as Comparative Example 10, an investigation was made in the same way for the case where a powdered phenol resin was employed as the source material.

Experimental Example 28

In this experimental example, in the process shown in FIG. 9, an oxidizing heat treatment for 1 hour at 350° C. in air was carried out as the first activation treatment to obtain an active carbon base material having an average particle diameter of 0.8 µm, an oxidizing heat treatment for 1 hour at 350° C. in air was carried out for the second activation treatment, and heat treating for 0.5 hours at 900° C. was then performed. Other than this, an active carbon plate was produced in the same way as in Experimental example 16. The amount of binder added, however, was 47.4 parts by weight.

The capacitance was obtained in the same way as in Experimental example 10. These results are shown in Table 7.

Experimental Examples 29–33

With the exception of varying the grinding time in the vibrating ball mill, active carbon base materials with a variety of average particle diameters were produced in the same way as in Experimental example 28. A binder was added in response to the average particle diameter of the active carbon base material, and molding was performed to obtain an active carbon plate. Capacitance values were obtained in the same way as in Experimental example 10.

The grinding time, average particle diameter, and amount of binder added in each experimental example, and the capacitance values obtained are shown in Table 7.

Comparative Example 10

With the exception that a powdered phenol resin having an average particle diameter of 27 µm was employed as the source material and grinding was not carried out, an active carbon base material was obtained in the same way as in Example 28. The average particle diameter was measured and found to be 18.0 µm.

A binder was added in the amount of 41.0 parts by weight and an active carbon plate was obtained in the same way as in Experimental example 19. Discharge experimental examples were carried out as in Experimental example 10 and the capacitance was obtained. These results are shown in Table 7.

TABLE 7

| | grinding time (h) | average particle diameter (μm) | binder amount added (parts) | capacitance (F/cm³) | |
|---|---|---|---|---|---|
| | | | | 4 mA/cm² | 400 mA/cm² |
| Experimental Example 28 | 30 | 0.8 | 47.4 | 64.9 | 33.2 |
| Experimental Example 29 | 8 | 2.2 | 46.0 | 64.0 | 31.4 |
| Experimental Example 30 | 3 | 6.1 | 44.2 | 63.1 | 30.8 |
| Experimental Example 31 | 1 | 23.2 | 41.6 | 60.5 | 28.9 |
| Experimental Example 32 | 0.3 | 26.8 | 39.4 | 54.0 | 22.8 |
| Experimental Example 33 | 0.15 | 37.0 | 38.5 | 48.8 | 16.8 |
| Comparative Example 10 | — | 18.0 | 41.0 | 57.8 | 25.7 |

Figure 13:
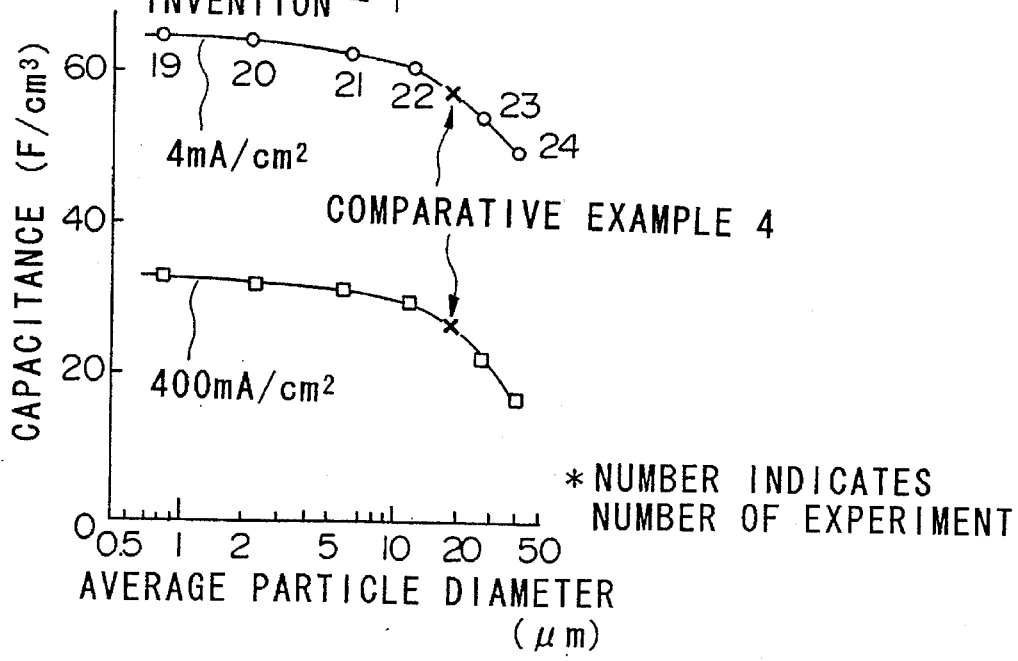
FIG. 13 is a graph which displays the results of embodiment 7 of the present invention and shows the relationship between capacitance of an active carbon electrode and average particle diameter in the active carbon base material.

From on the results shown in Table 7, the relationship between the average particle diameter in the active carbon base material and capacitance are shown in the graph in FIG. 13. As is clear from this figure, a high capacitance is maintained when the average particle diameter is not more than 10 μm. However, when the average particle diameter exceeds 10 μm, the capacitance rapidly falls.

Further, when FIGS. 11, 12 and 13 was compared, it was determined that the level of capacitance obtained is higher in the case where an oxidizing heat treatment was carried out in air for the first and second activation treatments (FIG. 13), than in the case where activation in carbon dioxide gas or in steam is carried out for the first and second activation treatments (FIGS. 11 and 12).

It will be appreciated by persons skilled in the art that numerous variations and/or modifications may be made to the inventions as shown in the specific embodiments without departing from the spirit or scope of the invention as broadly described. The present embodiments are, therefore, to be considered in all respects as illustrative and not restrictive.

What is claimed is:

1. A method of production for an active carbon electrode for use as an electrical double layer condenser, comprising the steps of:

a) producing a carbon base material by carrying out a first activation treatment to a carbon material obtained by carbonization of a carbon compound;

b) producing a formed body by adding a binder to the carbon base material;

c) carbonizing the formed body; and d) producing an active carbon electrode by carrying out a second activation treatment to the carbonized formed body, wherein the first activation treatment is heating a carbon material in at lest one of a carbon dioxide atmosphere, a steam atmosphere, and an atmosphere of carbon dioxide and steam, wherein the second activation treatment is heating the carbonized formed body in at least one of a carbon dioxide atmosphere, a steam atmosphere, and an atmosphere of carbon dioxide and steam; and wherein the total activation yield, which is obtained by the following formula (ii):

$$\text{total activation yield (\%)} = \frac{\text{activation yield from first activation} \times \text{activation yield from second activation}}{100}$$

is approximately 70% to 95%.

2. A method of production of an active carbon electrode for use as an electrical double layer condenser according to claim 1, wherein the carbon compound is a phenol resin.

3. A method of production of an active carbon electrode for use as an electrical double layer condenser according to claim 1, wherein the binder is a composition consisting of phenol resin powder, organic solvent and a lipophilic liquid.

4. A method for production for an active carbon electrode for use in an electrical double layer condenser characterized in comprising the steps of:

a) producing a carbon base material by carrying out a first oxidation treatment to a carbon material obtained by carbonization of a carbon compound;

b) producing a formed body by adding a binder to the carbon base material;

c) carbonizing the formed body;

d) carrying out a second oxidation treatment to the carbonized formed body; and e) producing an active carbon electrode by carrying out an activating heat treatment to the formed body which has undergone a second oxidation treatment, wherein the first oxidation treatment is heating a carbon material in at least one of an atmosphere of air and an atmosphere of a mixed gas containing oxygen, the second oxidation treatment is heating a carbonized formed body in at least one of an atmosphere of air and an atmosphere of a mixed gas containing oxygen, the activating heat treatment consists of heating a formed body which has undergone the second oxidation treatment in an inactive gas atmosphere, and the heat treatment yield, which is obtained by the following formula (iii):

$$\text{heat treatment yield (\%)} = \frac{\text{weight after activating heat treatment of formed body}}{\text{weight after carbonization of formed body}} \times 100$$

is approximately 70% to 95%.

5. A method of production for an active carbon electrode for use in an electrical double layer condenser according to claim 4, wherein the carbon compound is phenol resin.

6. A method of production for an active carbon electrode for use in an electrical double layer condenser according to claim 4, wherein the binder is a composition consisting of phenol resin powder, organic solvent and a lipophilic liquid.

7. A method for producing an active carbon electrode for use as an electrical double layer condenser, comprising the steps of:

a) performing an activation treatment to a carbon material obtained by carbonization of a carbon compound, and grinding the activated carbon material to produce an active carbon base material having an average particle diameter of not more than 10 μm;

b) producing a formed body by adding a binder to the active carbon base material and forming into a plate-shape; and c) making an active carbon plate by carbonizing the formed body, wherein the activation treatment in step a) is heating a carbon material in at least one atmosphere selected from the group consisting of a carbon dioxide atmosphere, a steam atmosphere, an air atmosphere and mixtures thereof.

8. A method of production for an active carbon electrode for use in an electrical double layer condenser, comprising the steps of:

a) carrying out an activation treatment to a carbon material obtained by carbonizing a carbon compound, and grinding the activated carbon material to produce an active carbon base material having an average particle diameter of not more than 10 μm;

b) producing a formed body by adding a binder to the active carbon base material and forming into a plate-shape;

c) making an active carbon plate by carbonizing the formed body; and d) carrying out another activation treatment to the active carbon plate, wherein the activation treatment in step a) is heating a carbon material in at least one atmosphere selected from the group consisting of a carbon dioxide atmosphere, a steam atmosphere, an air atmosphere and mixtures thereof, and the activation treatment in step d) is heating an active carbon plate in at least one atmosphere selected from the group consisting of a carbon dioxide, a steam atmosphere, an air atmosphere and mixtures thereof.

9. A method of production for an active carbon electrode for use in an electrical double layer condenser according to claim 8, wherein the activation treatment in step a) is heating a carbon material in at least one of a carbon dioxide atmosphere, a steam atmosphere, and an atmosphere of carbon dioxide and steam, and the activation treatment in step d) is heating an active carbon plate in at least one of a carbon dioxide atmosphere, a steam atmosphere, and an atmosphere of carbon dioxide and steam.

10. A method of production for an active carbon electrode for use in an electrical double layer condenser according to claim 8, wherein the activation treatment in step a) is heating a carbon material in air, and the activation treatment in step d) is heating an active carbon plate in air.

* * * * *